J. P. JENSEN.
SAW HANDLE.
APPLICATION FILED JAN. 20, 1912.

1,071,426.

Patented Aug. 26, 1913.

Witnesses:

Inventor,
Jonas P. Jensen
Attorneys

UNITED STATES PATENT OFFICE.

JONAS P. JENSEN, OF SILVER BEACH, WASHINGTON.

SAW-HANDLE.

1,071,426.  Specification of Letters Patent.  Patented Aug. 26, 1913.

Application filed January 20, 1912. Serial No. 672,521.

*To all whom it may concern:*

Be it known that I, JONAS P. JENSEN, a citizen of the United States, and a resident of Silver Beach, in the county of Whatcom, in the State of Washington, have invented new and useful Improvements in Saw-Handles, of which the following is a specification.

This invention relates to improvements in saw handles.

The object of the invention is to provide a simply constructed handle having reliable means for engaging the edge of the rear end of a saw blade.

Another object is to provide jaws for engaging opposite faces of a saw blade, said jaws being adjustable to adapt them for use on saws having transversely spaced apertures arranged at varying distances apart.

With these and other objects in view, the invention consists of certain novel features of construction, and the combination and arrangement of parts as will be more fully described and claimed.

Figure 1:
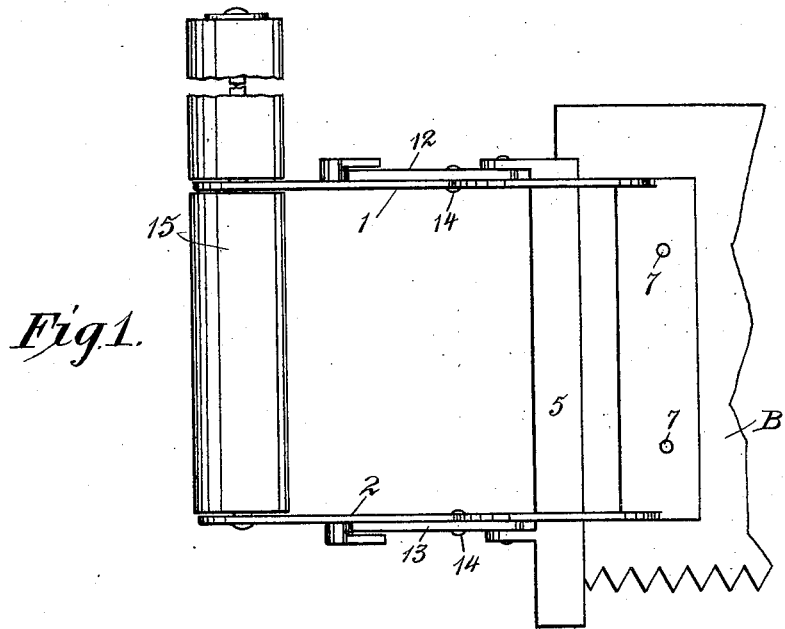
Figure 2:
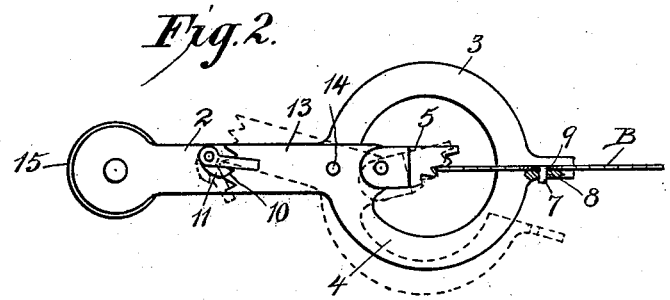

In the accompanying drawings: Figure 1 represents a side elevation of a saw handle constructed in accordance with this invention applied, a portion of the saw blade being broken off; Fig. 2 is a top plan view thereof.

In the embodiment illustrated blade clamping jaws 1 and 2 are shown, one of which is fixed and the other movable and both of which are provided with semi-circular portions 3 and 4 arranged intermediately of their ends and positioned opposite each other when the jaws are in closed or operative position, forming an annular member into which the rear end of a saw blade B is designed to extend and in which is mounted an eccentric longitudinally corrugated or grooved blade holding member 5. This holder 5 is secured to the movable jaw 2 and moves with said jaw to engage with or disengage from the corrugated seats the rear edge of the saw blade B.

The free ends of the jaws 1 and 2 are provided respectively with studs 7 and apertures 8, the studs 7 on the jaw 1 being positioned to project through the apertures 8 when the jaws are closed. The blade B is provided at its rear end with transversely spaced apertures 9 positioned to aline with the studs 7 when the parts are in operative position and through which said studs pass and engage the apertures 8 of the other jaw 2. Simultaneously with the closing of the jaw 2 the blade locking or holding member 5 swings into engagement with the rear edge of blade B, one of the seats of said member 5 receiving said blade edge. The rear end of the movable jaw 2 has teeth 10 with which are designed to be engaged a locking dog 11 for securing the jaw in closed position and in clamping engagement with the blade B.

As shown each jaw comprises two members or arms 12 and 13 mounted on a bolt 14 having threaded ends in threaded engagement with the jaw members, whereby said members may be adjusted toward or away from each other to position the studs and the apertures thereof for engagement with saw blades having apertures spaced different distances apart. The hand grip 15 of the handle is arranged between the members of the jaws and adjacent to which the locking dogs 11 are mounted.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents as circumstances may suggest or render expedient.

I claim as my invention.

1. A saw handle comprising a plurality of members pivoted to swing toward and away from each other, blade engaging jaws carried by said members and having means for locking engagement with a saw blade and blade holding means carried by one of said members and movable therewith for engaging the blade when the member is swung into closed position and for releasing it when said member is opened.

2. A saw handle comprising a pair of members pivoted to swing toward and away from each other, said members having clamping jaws for engaging opposite faces of the saw blade, and a corrugated member carried by one of said members for engaging the rear edge of a saw blade and holding it firmly in position.

3. A saw handle comprising pivotally connected members having means for clamping a saw blade and a longitudinally corrugated element carried by one of said members for engaging the rear edge of the saw blade to hold it firmly in operative position.

4. A saw handle comprising pivotally connected members having clamping means for engaging a saw blade, one of said members being provided with teeth, and a locking dog for engaging said toothed member for holding it in closed position.

5. A saw handle comprising pivotally connected jaws, an eccentric carried by one of said jaws having seats for the reception of the rear end of a saw blade, and means for locking said jaws in closed position.

In testimony whereof, I affix my signature, in presence of two witnesses.

JONAS P. JENSEN.

Witnesses:
W. F. DILLON,
W. E. BUDLONG.

Copies of this patent may be obtained for five cents each, by addressing the "Commissioner of Patents, Washington, D. C."